July 23, 1946.                HSIN-YA TIEN                2,404,467
INTERNAL-COMBUSTION ENGINE
Filed March 16, 1945

Inventor,
Hsin-Ya Tien
By Young, Emery & Thompson
Attorneys

Patented July 23, 1946

2,404,467

UNITED STATES PATENT OFFICE 2,404,467

INTERNAL-COMBUSTION ENGINE

Hsin-Ya Tien, Calcutta, India

Application March 16, 1945, Serial No. 583,110
In China April 16, 1944

5 Claims. (Cl. 123—78)

This invention relates to internal combustion engines and has for its object to increase the efficiency of the engine.

Internal combustion engines, at present in use, waste about a third of the heating value of the fuel consumed from the exhaust which is due to the fact that the expansion stroke is comparatively short and is equal to the effective suction stroke.

A principal object of the invention is to liberate the expansion ratio from the compression ratio by means of a combined piston whereby the power or expansion stroke and the exhaust stroke are made longer than the effective suction stroke.

A further object of the invention is to use the air of the engine itself for the purpose of cooling the cylinder walls and the piston and generally to use this air to act as a buffer to neutralize the vibration and shock in the engine parts due to the explosion of gases within the cylinder which is of great advantage when high octane fuel is used.

The invention may be applied to carry out the Walker cycle in the semi-Diesel engine, the Brayton cycle in the full Diesel engine or it may be applied to carry out the new thermo cycle according to the invention in the Otto engine.

According to the invention the piston head is provided with a variable air cushion whereby the power or expansion stroke and the exhaust stroke are made longer than the effective suction stroke.

In carrying out the invention into effect the piston head is provided with an air cushion formed by an outer shell fitted over the piston head or core, the outer shell being movable relatively to both the piston head and the cylinder, and air is admitted or expelled from the space so formed during the reciprocation of the piston in the cylinder so that an air cushion of variable size is formed on said piston head, whereby the power or expansion stroke and the exhaust stroke is made longer than the effective suction stroke.

The invention is more particularly described with reference to the accompanying drawing, which is of a diagrammatic nature, and in which.

Figure 1:
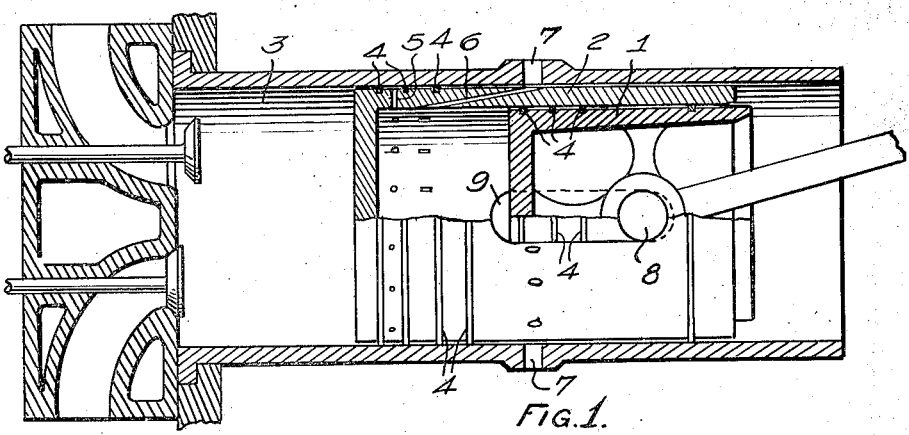
Fig. 1 is a longitudinal section through the cylinder and the piston, the piston being shown in part elevation.

Referring to the drawing:

The piston head comprises a piston core 1 working in an outer shell 2 which in turn works within the cylinder 3. Piston rings 4 are provided on the outer surface of both the piston core and the outer shell. Vents 5 and 6 are provided in the outer shell, the vents 5 being closer to the head or the closed end of the outer shell and are radially disposed thereto, while the vents 6 are located a little further away and are sloped away from the cylinder head.

Slots 7 preferably of larger size are provided on the cylinder through which air is drawn into or expelled from the space between the outer shell 2 and the piston core 1, during its reciprocational movement in the cylinder. These slots 7 being located so as to come into alignment with the vents 5 and 6 during the movement of the shell 2.

The relative positions of the vents 5 and 6 in the outer shell and the slots 7 in the cylinder body may be varied to suit particular conditions of working as desired.

The piston pin 8 by which the connecting rod is secured to the piston, is extended in length to pass through slots 9 in the piston shell, so that the piston shell cannot fly off the piston core when the piston core is pulled back to the right.

The four strokes or cycles according to the invention are more particularly described with reference to Fig. 2.

Figure 2A:
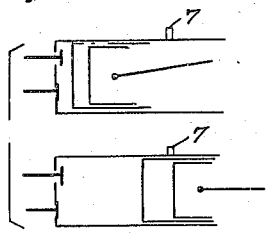
Figs. 2A, 2B, 2C and 2D are diagrammatic views showing the relative positions of the combined piston head in accordance with the invention at the suction, compression, power and exhaust strokes respectively.

The suction stroke is illustrated in the two positions shown in Fig. 2A. At the beginning of the suction stroke when the inlet valve is opened, the combined piston is located at the left end of the stroke near the cylinder head, and the piston shell is in contact with the piston core. As the core is drawn to the right by the piston rod, a partial vacuum is produced between the core and the shell; gradually the shell will move to the right also by the suction or the vacuum and the friction between the core and the shell. The air or the mixture of air and fuel is then sucked into the cylinder as shown in the upper portion of Fig. 2A. As soon as the vent holes 6 come opposite the slots 7 air rushes in from outside to break the vacuum and fills up its space. As both the force of the impact of the air to the shell and the friction between the shell and cylinder wall are in the opposite direction to the motion of the combined piston, the shell is stopped; but the core still moves to the right as shown in the lower portion of Fig. 2A and the fuel charge and outside air will continuously enter the combustion chamber and the vacuum space respectively until the end of the stroke is reached when the suction stroke is completed. It is to be noted that either air or a mixture of fuel gas and air may be drawn into the cylinder during the suction stroke. In some types of engines air is admitted alone and is compressed while the fuel charge is injected into the cylinder under pressure.

Figure 2B:
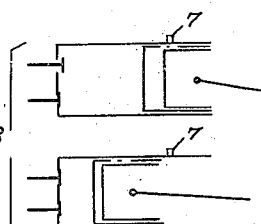

The compression stroke is illustrated in the two positions shown in Fig. 2B. When the compression stroke is started, the piston core is at first pushed to the left by the crankshaft, but this movement of the core only pushes out the air within the piston shell through the vent holes 6 and slots 7. (This air can be used to supercharge the combustion chamber by means not shown.) The shell still has no motion and the suction effect in the combustion chamber still continues as shown in the upper portion of Fig. 2B, until the core closes the vent holes 6. The remainder of the air is now compressed forming a cushion between the core and the shell. The inlet valve will now close and then the core will push the shell forward by means of the cushioned air which acts as a buffer as shown in the lower portion of Fig. 2B and the air or fuel charge is compressed up to the end of the stroke.

Figure 2C:
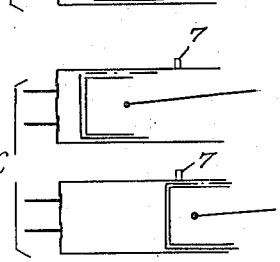

The power stroke is illustrated in the two positions shown in Fig. 2C. At the end of the compression stroke owing to the injection of fuel oil or to ignition, the explosion occurs: the high pressure now produced in the cylinder presses against the shell and the cushioned air and causes the core to move to the right. The thickness of the air cushion is also reduced by the high pressure in the cylinder. At this stage, due to the position of the core 1, the vent holes 6 have no chance to communicate with the slots 7, and only when the vents 5 pass slots 7, can the compressed cushioned air escape through the vents 5 and slots 7 to the outside. Owing to the shell and the core obtaining the same velocity and the same direction in motion, even though they may contact each other, no impact will occur as shown in the lower portion of Fig. 2C. The fact that the power stroke is longer than the effective suction stroke is one of the important features of this invention, from which more power is obtained.

Figure 2D:
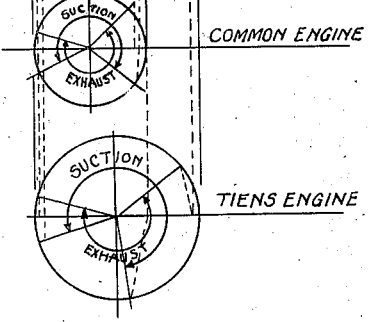
Figure 3:
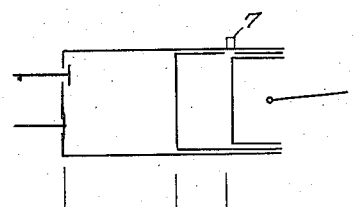
Fig. 3 is an indicator diagram and time diagram of the usual or known type of internal combustion engine compared with that in accordance with the present invention.

The exhaust stroke is illustrated in the positions shown in Fig. 2D. When the combined piston returns to the left for the second time, the exhaust valve opens, the burnt gas is pushed out by the piston up to the end of the stroke, as shown in the lower portion of Fig. 2D. When the piston core begins to return to the right again, the shell has tendency still to move to the left by the inertia. Due to the resistance of burnt gas at the front and by the vacuum forming at the back it will be impossible for the piston shell to strike the cylinder head. The four strokes or cycles are now complete and when the core returns to the right for the third time, it will commence the suction stroke again.

Having now particularly described and ascertained the nature of my said invention and in what manner the same is to be performed, I declare that what I claim is:

1. An internal combustion engine in which the piston head comprises an outer shell and an inner core, the outer shell having vent holes which communicate with slots formed in the cylinder body whereby air is admitted into or expelled from the space between the outer shell and the inner core during the reciprocation of the piston in the cylinder so that an air cushion of variable size is formed on said piston head whereby the power or expansion stroke and the exhaust stroke are made longer than the effective suction stroke of the engine.

2. An internal combustion engine in which the piston head comprises an outer shell and an inner core which work one within the other in the cylinder body, the outer shell having two sets of vents, one set located near the end of the outer shell and directed radially outwards while the second set of vents which are located at a short distance from the end of the outer shell are sloped away from the cylinder head; the said vents communicating with slots formed in the cylinder body whereby an air cushion of variable size is formed on the piston head.

3. An internal combustion engine in which the piston head comprises an outer shell and an inner core, the outer shell having vent holes which communicate with slots formed in the cylinder body whereby air is admitted into or expelled from the space between the outer shell and the inner core during movement of the said piston head, the relative position of the said vent holes in the outer shell and the slots in the cylinder being varied to suit particular conditions as may be desired.

4. An internal combustion engine in which the piston head comprises an outer shell and an inner core adapted to reciprocate in said outer shell, the outer shell having vent holes which communicate with slots formed in the cylinder body whereby air is admitted into or expelled from the space between the outer shell and the inner core during movement of the said piston head, the relative sizes of said vent holes in the outer shell and the slots in the cylinder body being varied to suit particular conditions as may be desired.

5. An internal combustion engine in which the piston head comprises an outer shell and an inner core adapted to reciprocate in said outer shell, the outer shell having two series of vent holes which communicate with slots formed in the cylinder body whereby air is admitted into or expelled from the space between the outer shell and the inner core during movement of the said piston head, said two series of vent holes being so spaced and directed that they communicate one after the other with the slots in the cylinder body.

HSIN-YA TIEN.